United States Patent
Serpa (10) Patent No.: US 7,653,818 B2
(45) Date of Patent: *Jan. 26, 2010

(54) SYSTEM AND METHOD FOR USER AUTHENTICATION WITH ENHANCED PASSWORDS

(76) Inventor: Michael Lawrence Serpa, P.O. Box 478, San Francisco, CA (US) 94104

( * ) Notice: Subject to any disclaimer, the term of this patent is extended or adjusted under 35 U.S.C. 154(b) by 835 days.

This patent is subject to a terminal disclaimer.

(21) Appl. No.: 11/187,345

(22) Filed: Jul. 21, 2005

(65) Prior Publication Data

US 2005/0273624 A1 Dec. 8, 2005

Related U.S. Application Data

(63) Continuation of application No. 10/228,551, filed on Aug. 27, 2002, now Pat. No. 6,954,862.

(51) Int. Cl.
    H04L 9/32 (2006.01)
(52) U.S. Cl. ........................ 713/184; 713/183; 340/5.54
(58) Field of Classification Search .................. 713/184
    See application file for complete search history.

(56) References Cited

U.S. PATENT DOCUMENTS

| | | |
|---|---|---|
| 4,621,334 A | 11/1986 | Garcia |
| 4,805,222 A | 2/1989 | Young et al. |
| 5,684,951 A | 11/1997 | Goldman et al. |
| 5,719,941 A | 2/1998 | Swift et al. |
| 5,812,819 A | 9/1998 | Rodwin et al. |
| 5,821,933 A | 10/1998 | Keller et al. |
| 5,844,497 A | 12/1998 | Gray |
| 5,845,070 A | 12/1998 | Ikudome |
| 5,872,917 A | 2/1999 | Hellman |
| 5,937,068 A | 8/1999 | Audebert |
| 6,006,333 A | 12/1999 | Nielsen |
| 6,079,021 A | 6/2000 | Abadi |
| 6,134,657 A | 10/2000 | Johnson et al. |
| 6,141,760 A | 10/2000 | Abadi et al. |
| 6,145,086 A | 11/2000 | Bellemore |
| 6,151,593 A | 11/2000 | Cho et al. |
| 6,192,478 B1 | 2/2001 | Elledge |

(Continued)

OTHER PUBLICATIONS

Monrose et al. "Keystroke dynamics as abiometric for authentication," 2000, Elsevier Science, pp. 351-359.

(Continued)

*Primary Examiner*—Matthew B Smithers
(74) *Attorney, Agent, or Firm*—Woodcock Washburn LLP (57) ABSTRACT

A system and method for enhancing passwords, access codes, and personal identification munbers by making them pace, rhythm, or tempo sensitive. The password includes a sequence of characters and an associated timing element. To access a restricted device or funcion a user enters the correct character sequence according to the correct pace, rhythm, or tempo. The entered sequence and timing elementare compared with stored values and access is granted only if the entered and stored values match. In an alternative embodiment the stored timing element is set, and periodically altered, by a computer or program without consent from the user and visual, auditory, and/or tactile prompts indicate the correct timing element to the user during the authentication process. The meaning of the prompts are provided to the user in advance.

59 Claims, 2 Drawing Sheets

U.S. PATENT DOCUMENTS

| | | |
|---|---|---|
| 6,195,698 B1 | 2/2001 | Lillibridge |
| 6,199,101 B1 | 3/2001 | Pfaff |
| 6,209,102 B1 | 3/2001 | Hoover |
| 6,278,453 B1 | 8/2001 | Bodnar |
| 6,327,659 B2 | 12/2001 | Boroditsky et al. |
| 6,332,192 B1 | 12/2001 | Boroditsky et al. |
| 6,353,891 B1 | 3/2002 | Borella et al. |
| 6,370,649 B1 | 4/2002 | Angelo et al. |
| 6,442,692 B1 * | 8/2002 | Zilberman ................ 713/184 |
| 6,720,860 B1 | 4/2004 | Narayanaswami |
| 6,954,862 B2 * | 10/2005 | Serpa ........................ 726/5 |
| 2002/0188854 A1 | 12/2002 | Heaven et al. |

OTHER PUBLICATIONS

Monrose et al. "Authentication via keystroke dynamics," 1997, ACM, pp. 48-56.
International Search Report, PCT/US03/26378, May 10, 2004, 1 page.
International Preliminary Examination Report, PCT/US03/26378, Sep. 22, 2004, 5 pages.
Supplementary European Search Report, EP 03 79 1729, Jan. 13, 2009, 1 page.
European Office Office Action, EP 03791729.1, Apr. 7, 2009, 6 pages.

* cited by examiner

SYSTEM AND METHOD FOR USER AUTHENTICATION WITH ENHANCED PASSWORDS

CROSS-REFERENCE TO RELATED APPLICATIONS

This application is a Continuation of U.S. patent application Ser. No. 10/228,551, filed Aug. 27, 2002, now U.S. patent Ser. No. 6,954,862, the entirety of which is incorporated by reference.

FIELD OF THE INVENTION

This invention relates generally to codes used for authorizing user access. In particular, it relates to passwords used with computers, electronic devices, and networks.

BACKGROUND OF THE INVENTION

One common security feature for controlling access to computers and/or computer systems is a private code unique to a user that must be accepted by the computer to gain entry. Normally referred to as a password or personal identification number ("PIN"), these access codes are widely employed in a variety of applications to guard restricted functions.

Though very useful, passwords and PINs are not problem-free. The primary obstacle is the user's memory as it is not unusual for a user to have to remember a number of different passwords. Many users, for example, have a PIN for accessing a savings or checking account at either an automated teller machine ("ATM") or point-of-sale, a password for unlocking a mobile phone and/or a password for accessing a voicemail system, one or more passwords for using a desktop computer or a handheld computer device, a separate password for opening an e-mailbox, etc.

And it is not uncommon, as security concerns of all types increase, for a workplace to install electronic cipher locks that require the entry of a code to gain admittance to a facility.

Even the lucky user who need memorize only a single password is often now required to change the password periodically to increase protection. Authorized users who access restricted operations infrequently have an even greater problem because one's memory of a password can fade if not reinforced through regular use.

To lessen the chances of forgetting it, users often select as their password a frequently used word (such as "password"), the name of a family member or favorite celebrity, or a common keystroke pattern (e.g. "qwerty") on a keyboard. A few users, as a memory aid, resort to writing their password down on a piece of paper. Clearly security can be seriously compromised by such practices.

Some system operators, in response to threats against and attacks on their computer systems, are considering mandating the use of so-called "complex" passwords that must include upper and lower-case letters as well as numbers. Remembering one's password will only become more difficult as a result of these and other procedures. Unfortunately, a human being's memory typically does not improve with age so the problem of forgotten passwords will likely become more prevalent among an aging population of computer users.

The second problem usually associated with password use is the relatively low protection they offer. Longer passwords are harder to crack than shorter ones, but sophisticated hackers using automated schemes can try millions of different passwords in a matter of moments. Thus, a longer password does not necessarily result in perfect security. Furthermore, especially when using an ATM or a stand-alone electronic device in a public area, there is always a possibility that the user can be observed entering their password (the so-called "shoulder surfing hack").

To address these and other problems a number of replacements for passwords have been proposed. Most notable are those arrangements based on sophisticated cryptographic techniques or challenge-response authentication schemes. Many of these approaches, however, only work if there are multiple computers involved (for example, a client and a host) that can both encode and decode passwords. Another limitation of these solutions is that they do not always relieve the user from having to memorize a complicated password and/or change their password frequently. Even solutions that do effectively eliminate long passwords remain vulnerable to code-breaking software attacks.

Some additional disclosures rely on biometric identification. Still other approaches suggest using iconic passwords that have visual images in place of words. (To input an iconic password the user must select or manipulate an image.) All of these approaches might work, though they also necessitate fundamental changes to existing computer systems. Significant economic costs associated with the extensive changes required, or other hurdles, might make these solutions impractical in some instances.

The ideal solution for strengthening passwords/PINS would be one that can be installed through software instructions and/or hard-wired circuitry in a variety of applications, including stand-alone devices and gadgets or mechanisms (stand-alone or otherwise) that lack speakers or a display. It should also be compatible with both single-user and multi-user systems. The present invention provides such a solution and is therefore conducive to widespread use. It is intended to increase the security afforded by passwords and to make them easier to use.

SUMMARY OF THE INVENTION

The preferred embodiments add a timing element to the access code. That is, a user not only enter the exact password/PIN into the subject device or system but does so according to a certain pace, rhythm, or tempo. In a first embodiment this pace is predetermined, set either by the user or by a computer/computer program (with the user's consent) and stored in computer memory. In a second embodiment the pace is set, and can be altered, by the computer or program responsible for authorizing users. The user does not know the pace, rhythm, or tempo in the second embodiment and authentication results only from a correct user response to visual, auditory, and/or tactile prompts from the computer/program. These prompts disclose to the user the operable timing element. Of course, it will be understood that the user has advance knowledge of the meaning of the various true and false prompts.

As a result of the added timing element, the protection provided by the password or access code is significantly improved.

In the case of the above-described second embodiment, the act of entering a password/PIN is a two-way communication process in which output from the computer or computer system—in the form of the visual, auditory, or tactile prompts—is important in addition to the password entered by the user. The output does not contain any portion of the password; rather, the output tells the user when it is appropriate to enter all or a portion of the password. Failure by the user to engage each keystroke (or otherwise enter a portion of the password/

PIN by mouse click, electronic pen, button press, etc.) in response to specific output signals will result in denial of access.

With the fist embodiment the user memorizes a certain pace, rhythm, or tempo of their password along with the password itself. With the second embodiment the user memorizes certain visual, auditory, and/or tactile prompts (along with the password), such that the user can identify and respond to true prompts while ignoring false prompts. Both embodiments, though, provide a pace, rhythm, or tempo sensitive password/access code. This novel feature offers many advantages over the prior art.

To begin with, this system and method is less taxing on users than approaches relying solely on long and complex passwords because many individuals would find remembering a password pace or tempo, as in the first embodiment, or visual, auditory, or tactile signals, as in the second embodiment, to be a relatively minor additional burden. Rhythms and tempos are a natural part of life and many individuals retain memory of a particular rhythm without much effort. Other individuals are able to recall images, sounds, or tactile sensations very easily and these people would respond well to prompts which, when seen, heard, or felt, indicate to the user the timing element of a password. (The illustrated embodiments will work perfectly well with long passwords, but one significant advantage is the ability to enhance the security of even short passwords.)

Furthermore, because the pace, rhythm, or tempo of password/PIN entry is important, a hacker could not gain unauthorized access by using a powerful computer to quickly try many possible password combinations. If, for example, the correct entry of the password "rain" requires a four-second pause between entry of the "r" and entry of the "a," the hacker's split-second password-cracking technology will have been thwarted. Any automated attack must attempt to anticipate pauses incorporated within the password, thus greatly increasing both the time it takes to try passwords as well as the expense of doing so. Computer time costs money. A four-second wait added to an authentication sequence will not overly burden the legitimate user, but this simple change significantly increases the level of protection provided against unauthorized intruders.

Finally, the pace, rhythm, or tempo sensitive password provided by the present invention can be applied to any device, system, or network that has computer memory and determines access privileges based on a password, an access code, or a PIN. It will work with any type of electronic gadget that has computer memory and does not depend upon multiple computers that can communicate with each other. It can also be employed for authorizing user access to just a particular application or database. The present invention is not dependent upon any particular input method, and will work regardless of whether an access code is entered by keyboard, keypad, mouse click, button press, or electronic pen (such as those used with personal digital assistants and tablet PCs). It is even compatible with voice-recognition systems.

DETAILED DESCRIPTION OF THE PREFERRED EMBODIMENT

This description will concern primarily the process by which a user logs on to a computer, computer device, or computer network because that is a primary use for the present invention. However, it should be understood that the present invention is not limited to this specific application. The present invention can be employed in any situation where user authentication is desirable and determined by an access code. All password-protected systems share some traits for authorizing users, and where differences from the computer login process exist they are noted below. Examples of domains to which passwords are used for gaining access are provided in the background section above, including physical locations (e.g., by way of cipher locks) as well as electronic data files and programs.

Most login sequences begin with the host computer asking the user to enter an identification name, number, or character string, often called a "user ID," followed by a password/PIN. This approach involves a process in which the user and host computer first agree on a user ID and an associated password character sequence. ["Password" as used herein will refer to all access codes whether comprised of characters such as letters, numbers, symbols, punctuation marks, or any combination of the above.] These entries are made in a secure manner and the host computer stores these values. To access the system, the user enters the user ID string and password. The host computer then compares the offered password with the value previously stored for that user. If the offered and stored passwords agree, the user is granted access.

If the offered and stored passwords do not agree the user is normally asked to try again because users occasionally make errors when entering a password. However, in some login processes the rate at which passwords may be retried is limited (e.g., once every five seconds) to prevent automated attacks in which password guesses are tried at electronic speeds. For similar reasons the number of incorrect login attempts is often limited—such as to three attempts—after which the user account is put on hold pending investigation of a possible attack. These limits place little or no burden on legitimate users because humans can only enter a password once every few seconds anyway and rarely enter incorrect passwords many times in a row. The unauthorized intruder, though, using an automated attack, might be severely impeded by the same limits because the attack is at least interrupted if not stopped completely.

An arrangement like this has a certain degree of inherent security. But the security can be breached if an unauthorized person is told, guesses, or captures the user ID and password. That such events occur with increasing frequency indicates systems remain vulnerable.

To augment security the preferred embodiments of the present invention takes the timing element one step further by making the password pace, rhythm, or tempo sensitive. Just as a-time-sensitive login process (e.g. limiting the rate at which passwords may be retried) thwarts some attacks, adding a timing element (i.e., a rate or pattern of password entry) to the password itself will substantially increase protection from unauthorized access. The pace, rhythm, or tempo of keystrokes becomes as much a part of the password as the actual letters, numbers, or symbols comprising the password. An unauthorized individual might still obtain the ID and password belonging to a legitimate user but, without knowledge of the correct timing element associated with the password, the information will be useless. Because the password is pace, rhythm, or tempo sensitive, access is restricted to those who know both the password and the pace, rhythm, or tempo of the password.

[NOTE: Some authentication arrangements do not include user IDs and require only the entry of a password to gain access. Two current examples of this are cellular telephones and hand-held electronic devices such as personal digital assistants. The preferred embodiments of the present invention can be employed in these situations as well as those that rely on the user ID/password combination.]

A simple example of the first embodiment of the present invention is a password that consists of only a single character, such as the letter "z" entered six times in a row. When the timing element is added this simple password becomes a much more complicated code providing a greater level of protection. One possible pattern for the timing element of this password is two distinct three-keystroke combinations with a slight pause in between. The first three keystrokes are struck within a set time period (for example, a two-second period) and this entry is then followed by a pause of some predetermined length. (In this example, the pause could be between four and six seconds long.) After this pause the final three keystrokes must then be entered within a set time period (e.g., a two-second period). The pattern would thus appear something like: "zzz" (pause) "zzz".

A variation of this same password would appear as "zz" (pause) "zz" (pause) "zz." Another variation could consist of "zzz" (pause) "zz" (pause) "z". Still others are "z" (pause) "zzzzz"; "zzzz" (pause) "zz"; or "z" (pause) "z" (pause) "z" (pause) "z" (pause) "z" (pause) "z"; etc.

It is apparent from a consideration of these examples that numerous other versions of the same password are made possible simply by changing the length of the pauses. The set time periods during which keystrokes must be engaged (or characters otherwise entered) are variable as well and can be adjusted based on the sensitivities of the user. Changing any of these variables increases the protection resulting from the password.

Obviously, more complex (and, consequently, more secure) passwords can be created by including numbers, symbols, and other letters. A pause can be added between any two characters, and can even be added between the last character of the password and an input command (i.e., a keystroke, button press, etc. that inputs the password into the system).

[NOTE: Most computer login sequences require an input command to enter a password or PIN. Examples of such a command are striking the "Enter" key on a keyboard and touching the "#" key when using a touch-tone phone system. In a normal computer login a user first types his or her password and then strikes the "Enter" key to send the password to the program or circuitry that will determine if it matches the stored value. Similarly, when accessing a restricted application via telephone users are often required to touch the "#" key after entering an access code. Because the preferred embodiments add a timing element to passwords and access codes, a system employing an input command stores an extra signal containing information about the speed/pace at which the user has typed (or written, spoken, etc.) the password/access code. This extra signal will then be inputted along with the password/access code when the input command is engaged. The extra signal will then be read by the system. (To protect the timing information from being electronically captured by an intruder, unique signals for the timing element are preferably employed.)

The input command, however, could be eliminated altogether (as in some existing applications), and one factor affecting the decision to eliminate the input command is whether, in addition to any internal system clock, a clock must be added to the actual input device in order to measure the timing element. There are other considerations and possibilities as well, and this choice ultimately is left to software writers, system designers, and hardware engineers.]

In the first embodiment of the present invention the pace, rhythm, or tempo of the password (i.e., the timing element) is set by the user or, with the consent of the user, by a computer or program. The timing element is then stored in computer memory. The timing element can be set at the same time the user selects a password or it can be done separately. Those skilled in the art will appreciate that there are many ways of storing the timing element in computer memory, and any means for accomplishing this is acceptable so long as it operates as described herein. Both the user and the computer/program agree on both the password and the pace, rhythm, or tempo of the password.

Figure 1:
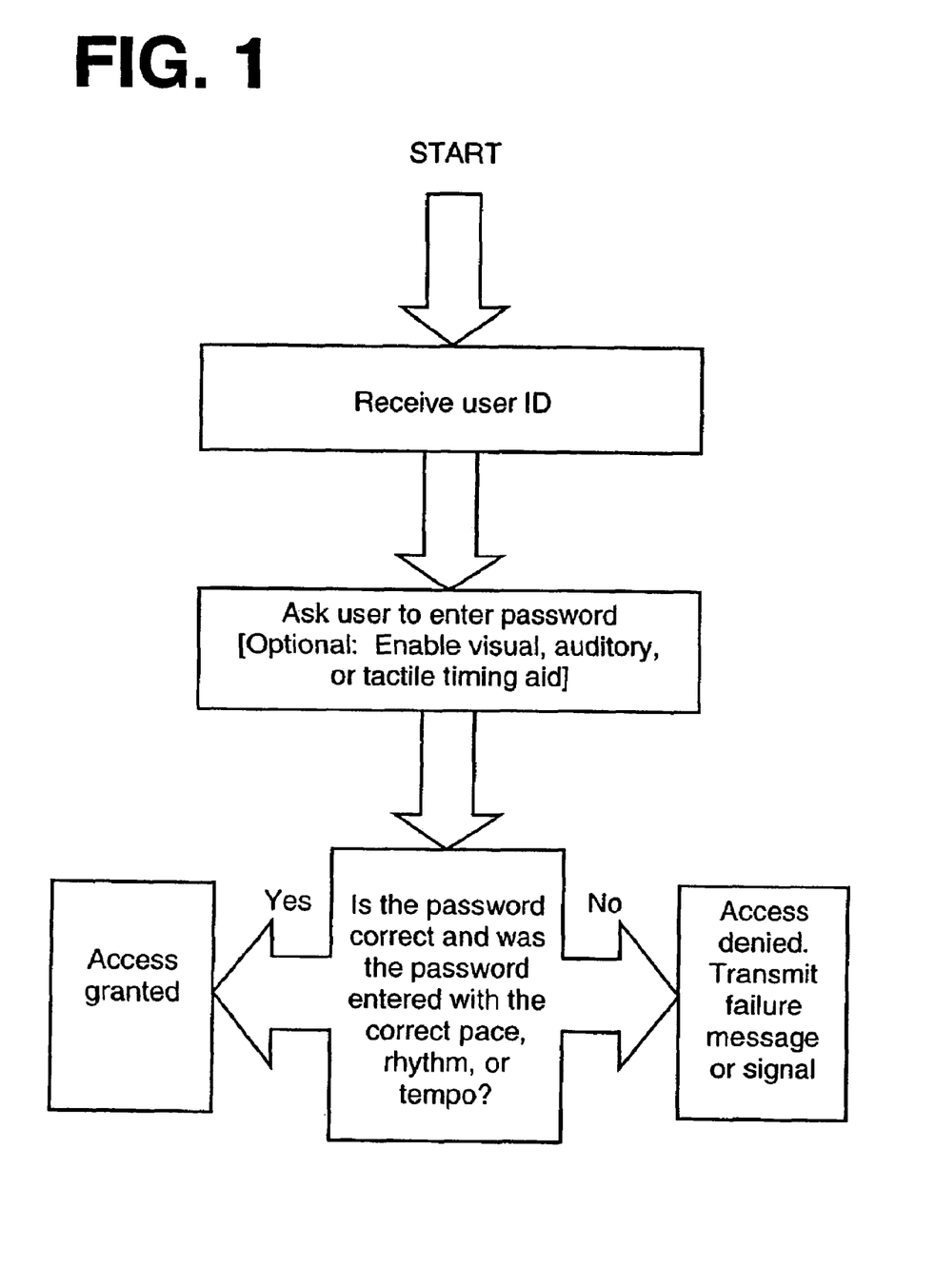
FIG. 1 is a flow diagram showing steps performed by an example authentication program operating in accordance with a first embodiment of the present invention.

Referring now to FIG. 1, there is shown a flow diagram illustrating the steps performed by a simple login program operating in accordance with this first embodiment of the present invention. The user begins by entering a user ID and the program receives this information. Next, the program asks the user to enter a password. A decision is then made as to whether the password is correct (i.e., does it match the password characters stored for that user?) and whether it was entered with the correct pace, rhythm, or tempo (i.e., does the pace, rhythm, or tempo of password entry match the stored pace, rhythm, or tempo for that password?). If the user has entered the correct password character sequence with the correct pace, rhythm, or tempo, the program continues and grants access to the restricted function. If the user has made an error in either the password characters/sequence or the timing element of the password, access is denied and a failure message or signal is generated. At this time the program may ask the user to try again.

As discussed above, some applications do not require a user identification name or number before the password/PIN is entered. A flow diagram for this type of program would appear as FIG. 1 without the step where the user ID is received.

To assist the user in entering their password with the correct pace, rhythm, or tempo, the system can display a visual feature such as a clock that ticks off seconds of time. Virtually any changing graphic image could act as a visual timing aid. Aside from a clock, some further possibilities are icons or shapes that change size, shape, or color, etc., with the passing of each second or other unit of time, or a pattern of accumulating images where an additional image is added with each passing second or other unit of time. Another option is to display numerals counting off seconds (i.e., "1", "2", "3", "4", "5" . . . etc.).

Alternatively, a system could provide an auditory timing signal of some sort or, in systems with the capacity to do so, a tactile timing signal. [NOTE: A few existing devices, such as pagers and cellular telephones, have the ability to provide a tactile, or "haptic," signal in the form of a vibration. In the future many other computer or electronic devices may have this ability in one form or another.] The visual, auditory, and/or tactile timing aid could also be external to the system. Many techniques are available to help a user correctly time password entry and it is apparent that use of the system and method of the present invention will not be hampered by time-gauging problems.

However, it is anticipated that certain users will prefer not to use any timing aid at all and will have no trouble committing to memory the pace, rhythm, or tempo aspect of a password.

The system and method of the present invention also has the unique advantage of allowing for the use of "ghost" characters in a password. This arrangement would be especially useful whenever a user is entering an access code in a situation where they can be observed by a third party. (Withdrawing funds from an ATM machine is an example of such a situation.) The ghost characters would be entered by the user during a pause portion of the password but would not be recognized by the subject computer or device as being a part of the password. Because the user knows that the ghost characters are not really a part of the password but the third party observer does not, the ghost characters serve to disguise the actual password.

This arrangement would work as follows: A user would unlock the ghost character feature before entering their password. This causes the device or system being accessed to ignore any characters entered during the pauses in the password. The pauses themselves are not altered. The user is now permitted to enter a particular or random string of characters during the pauses in their password. For example, if the password characters are "hn2 gm" and there is a five-second pause after the h and another five-second pause after the g, the user could add a number of additional characters to the password during these two pauses without interfering with acceptance of the password by the system. The above password could therefore appear as "hdsbn2 guiom" to the third-party observer. When through using the desired function the user would terminate access and lock the ghost character feature. Thereafter, the subject device or system would recognize all entered characters as part of the password and, obviously, deny access to anyone who enters the password "hdsbn2 guiom."

In the second embodiment of the present invention the timing element is set by the computer or program responsible for authorizing users and is unknown to the user. The timing element can also be altered by the computer or program without consent from the user. If desirable for a particular application, the timing element could change each time a user seeks access. Though the user does not need to memorize the timing element as in the first embodiment, the user must memorize particular visual, auditory, and/or tactile prompts that disclose to the user the correct pace, rhythm, or tempo of the password/PIN. These prompts are agreed upon beforehand between the user and the computer/ program and stored in computer memory.

This second embodiment might be preferred by users who feel more confident remembering visual, auditory, or tactile prompts as opposed to a pace, rhythm, or tempo.

The computer/program responsible for authorizing users could either store in computer memory a number of preset timing elements for passwords of different lengths and select from among these preset timing elements, or it could generate a random pace, rhythm, or tempo each time user authentication is required. Again, the selection of a timing element does not require the consent of, or input from, the user. The precise configuration of a particular system will depend upon the choices and needs of system designers.

A user of this second embodiment would first select and set a password character sequence. This password character sequence is stored by the computer/program responsible for user authentication. The user will also select certain visual, auditory, or tactile prompts that will be used in the authentication process. One convenient means of accomplishing this would be for the computer/program to supply the user with a library of familiar pictures and sounds—as well as a library of various tactile patterns for systems that are capable of providing a tactile output. The user would then select particular images, sounds, or tactile patterns to serve as the timing element prompts in an authentication sequence. The user must remember these particular images, sounds, or tactile patterns. They will be stored in computer memory along with the user's password character sequence. This process of selecting prompts can be completed when the user sets his or her password character sequence or it can be completed at a different time.

Some applications, depending upon the choices of system designers, might provide means for users to scan particular visual images (such as personal photos) or input specific sounds (such as favorite musical works or voices of family members) into the system to be used as prompts. Practices like these may be burdensome, but they also might significantly assist users in memorizing their visual and/or auditory prompts.

When the user requests access, the computer/program will generate random images on a display (or generate random sounds or tactile patterns). Interspersed with these random images, sounds, or tactile patterns (called "false prompts") will be the prompts previously selected by the user (called "true prompts"). The computer/program will generate only false prompts during the pauses in the user's password. However, whenever a true prompt is generated by the computer/program the user, recognizing the prompt, will enter—within a defined period of time allotted by the computer/program—a character of their password. This process will continue until the user has entered his or her entire password in correct sequence (i.e., a sequence matching that of the user's stored password).

False prompts can be generated simultaneously with true prompts, and this would serve to help disguise the true prompts from unwelcome observers. To illustrate, one or more false visual prompts could appear on the display along with a true prompt. The user would respond to the true prompt but a third party observer would not know which of the images triggered the user's response. As another variation, a false visual prompt could be generated simultaneously with a true auditory prompt. Also, an application using this second embodiment could require multiple true prompts before a password character can be entered. Variations abound here and it is possible to customize a system to fit the particular preferences of a user.

This second embodiment, like the first embodiment, is compatible with systems/gadgets employing an input command as well as those that do not employ an input command. If the subject device or system does employ an input command, then, as in the case of the first embodiment, the device used to input the password preferably has the capability to store an extra signal indicating the pace, rhythm, or tempo with which the user entered their password (by following the true prompts). This information, along with the password, would then be entered into the computer/program when the input command is engaged.

Figure 2:
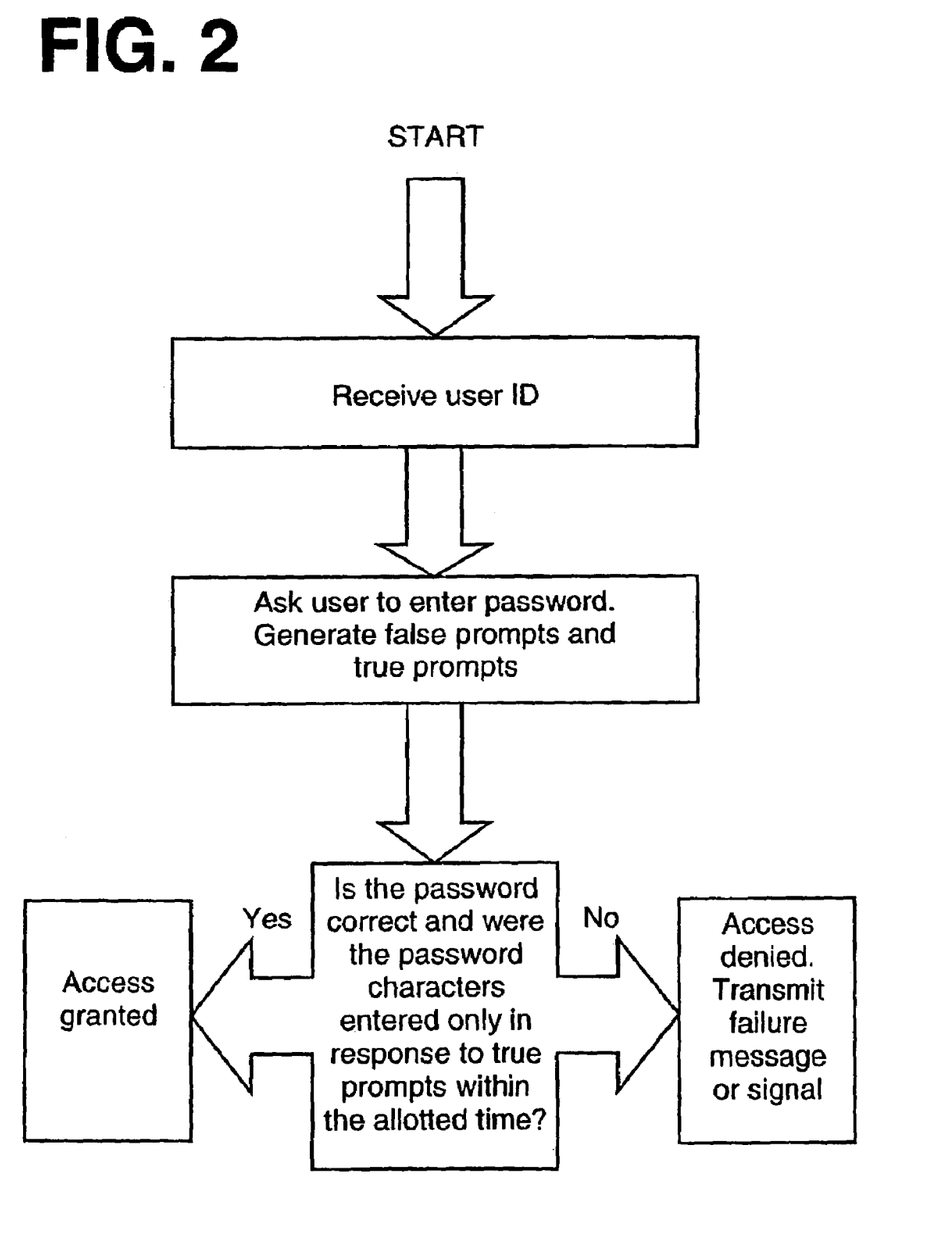
FIG. 2 is a flow diagram showing steps performed by an example authentication program operating in accordance with a second embodiment of the present invention.

In FIG. 2 is shown a flow diagram of steps performed by an example authentication program operating in accordance with this second embodiment. To access the restricted function the user would first enter their identification name or number. (Again, as with the first embodiment, the user ID could be eliminated for some applications. Multi-user systems benefit most from a user ID whereas personal stand-alone devices generally do not employ user-differentiating IDs.) Next, the user is asked to enter their password. At this point the computer or program will begin to generate both false prompts and true prompts as dictated by the operable timing element. As long as the user has entered each character of their password only when a true prompt was recognized, and has done so within the allotted time for doing so after a true prompt is generated, then access will be granted. By following the true prompts, which convey to the user the timing element, the user has entered his or her password/access code with the correct pace, rhythm, or tempo.

More sophisticated arrangements using this second embodiment could combine visual, auditory, and/or tactile prompts within a single password. Unless an intruder can detect all of the selected prompt media (e.g., see the system display, hear the system speakers, and receive the system tactile output, all at the same time), they will have tremendous difficulty discovering the true prompts for the password (assuming that they could discover the password itself!).

The preferred embodiments of the present invention give passwords and access codes an extra dimension by adding a timing element. Pace, rhythm, or tempo becomes an integral part of the password/access code. The present invention thus "enhances" passwords and access codes and improves the security they provide. These systems and methods offer several advantages over known authentication arrangements.

Among the advantages is ease of use. Passwords and access codes are made more complex without increasing the number of characters in the password that a user must memorize. Another advantage is ease of implementation. Ideally the systems and methods of the present invention would be implemented as part of the software or circuitry that controls the user authentication function for a particular application, but they are not limited to any specific combinations of hardware and software. A still additional advantage is the variety of possible applications. Essentially, the present invention is suitable for any device, apparatus, or system that determines access privileges based on a password, an access code, or a PIN.

The unique nature of these systems and methods could hold other benefits. Some users, depending upon their capabilities, might find that the timing element of their password actually makes the password easier to remember. Certainly, though, the present invention is not dependent upon any particular language skills or educational level—even a young child can use this system and method. Most individuals will be able to appreciate and apply pace, rhythm, or tempo sensitive passwords and access codes in accordance with the first embodiment (or comply with the visual, auditory, and/or tactile timing element prompts of the second embodiment) without difficulty.

Electronic gadgets that incorporate computer chips or otherwise rely on computers become more prevalent and diverse with each passing day and this trend will likely continue. Portable (and even wearable) computers have become commonplace. Undoubtedly, many of these new products will need to include some sort of security function for user validation. The user authentication system and method disclosed herein could in the future apply in many situations not presently anticipated.

Additional objects, advantages, and other novel features of the present invention will become apparent to those skilled in the art or may be learned with the practice of the invention. The scope of the invention is therefore not meant to be limited to the above-described examples but instead should be determined by the following claims and their legal equivalents.

What is claimed is:

1. A method for user authentication, the method involving the use of a database storing a selected access code and the same or another database storing a selected certain pace, rhythm, or tempo, wherein said selected certain pace, rhythm, or tempo is associated with said selected access code, said method comprising:
   providing a user with at least one the following to assist the user with entering the access code: a visual timing aid, an auditory timing aid, and a tactile timing aid;
   receiving an access code from the user and determining a pace, rhythm, or tempo at which the access code was entered by the user;
   determining that the entered access code matches a stored access code character sequence and that the certain pace, rhythm, or tempo at which the access code was entered matches a stored certain pace, rhythm, or tempo for the stored access code; and
   granting access based, at least in part, on the determination that (i) the entered access code matches the stored access code character sequence, and (ii) the certain pace, rhythm, or tempo of the access code as entered by the user matches the stored certain pace, rhythm, or tempo for the stored access code.

2. The method of claim 1, further comprising requiring a user to enter a user identification string associated with the stored access code character sequence prior to granting access.

3. The method of claim 1, wherein the selected certain pace, rhythm, or tempo is entered into the database as the access code is being entered into the database.

4. A method for user authentication, comprising:
   entering a first access code into a database;
   entering a certain pace, rhythm, or tempo into a database and associating said selected certain pace, rhythm, or tempo with said first access code;
   receiving a second access code from a user and determining a pace, rhythm, or tempo at which the second access code was entered by the user;
   determining that the entered second access code matches the stored first access code and that the certain pace, rhythm, or tempo at which the second access code was entered matches the stored certain pace, rhythm, or tempo for the stored first access code; and
   granting access to the user based, at least in part, on the determination that (i) the entered second access code matches the stored first access code, and (ii) the certain pace, rhythm, or tempo of the second access code as entered by the user matches the stored certain pace, rhythm, or tempo for the stored first access code;
   wherein the stored certain pace, rhythm, or tempo for the stored first access code is set and alterable by a computer without consent from the user; and further comprising providing prompts from the computer while receiving the second access code, wherein the prompts indicate to the user the stored certain pace, rhythm, or tempo for the stored first access code.

5. The method of claim 4, further comprising providing the user with prompt meanings prior to providing prompts.

6. The method of claim 4, wherein the prompts are selected from the group consisting of visual, auditory and tactile prompts.

7. A system for user authentication, the system comprising:
   a computer and a computer memory;
   an input device permitting input by a user;
   a user-defined password including a sequence of characters, wherein the sequence of characters of the user-defined password is stored in the computer memory;
   a computer generated timing element, the timing element defined by predetermined pauses associated with the sequence of characters, wherein the system is configured to provide user authentication when the user inputs the password sequence of characters with the input device according to the predetermined pauses of the timing element, and wherein the timing element is alterable by the computer without consent by the user; and a mechanism configured to provide the user with at least one of a visual, auditory, and tactile timing aid to assist the user with entering the access code.

8. The system of claim 7, further configured to selectively grant access to a domain upon entry of the password, wherein the domain comprises a physical location.

9. The system of claim 7, further configured to selectively grant access to a domain upon entry of the password, wherein the domain comprises a software program or file.

10. The system of claim 7, further including a user identification string associated with the password.

11. A system for user authentication, the system comprising:
   a computer and a computer memory;
   an input device permitting input by a user;
   a user-defined password including a sequence of characters, wherein the sequence of characters of the user-defined password is stored in the computer memory; and
   a computer generated timing element, the timing element defined by predetermined pauses associated with the sequence of characters, wherein the timing element is alterable by the computer without consent by the user, and wherein the system is configured to provide user authentication when the user inputs the password sequence of characters with the input device according to the predetermined pauses of the timing element;
   a ghost character feature, the ghost character feature capable of being locked and unlocked by the user;
   the ghost character feature permitting the user to input, during the pauses in the password or access code, additional characters; and
   the computer being configured to ignore the additional characters when the ghost character feature is unlocked.

12. A computer-readable storage device comprising computer readable instructions that, if executed by a computer, cause the computer to carry out a method for user authentication, the method involving the use of a database storing a selected access code and the same or another database storing a selected certain pace, rhythm, or tempo, wherein said selected certain pace, rhythm, or tempo is associated with said selected access code, the method comprising:
   providing a user with at least one of a visual, auditory, and tactile timing prompt to assist the user with entering the access code;
   receiving an access code from the user and determining a pace, rhythm, or tempo at which the access code was entered by the user;
   determining that the entered access code matches a stored access code character sequence and that the pace, rhythm, or tempo at which the access code was entered matches the certain pace, rhythm, or tempo associated with the stored access code.

13. A computer-readable storage device as recited in claim 12, further comprising instructions for granting access based, at least in part, on the determination that (i) the entered access code matches the stored access code character sequence, and (ii) the certain pace, rhythm, or tempo of the access code as entered by the user matches the stored certain pace, rhythm, or tempo for the stored access code.

14. A computer-readable storage device as recited in claim 12, further comprising instructions for altering the pace, rhythm, or tempo associated with the selected access code.

15. A computer-readable storage device as recited in claim 12, wherein the timing prompt is a visual timing aid.

16. A computer-readable storage device as recited in claim 12, wherein the timing prompt is an audible timing aid.

17. A computer-readable storage device as recited in claim 12, wherein the timing prompt is a tactile timing aid.

18. A computer-readable storage device as recited in claim 12, further comprising instructions for providing the user with advance knowledge of the timing aid.

19. A computer-readable storage device as recited in claim 12, further comprising instructions for associating the selected access code with a user identification code and for denying access to a user that does not provide both the selected access code and the associated user identification code associated.

20. A computer-readable storage device as recited in claim 12, wherein said computer is disposed in a network.

21. A computer-readable storage device as recited in claim 12, wherein said computer is disposed in a hand-held electronic device.

22. A computer-readable storage device as recited in claim 12, wherein said computer is disposed in a cellular telephone.

23. A computer-readable storage device as recited in claim 12, further comprising instructions for providing false timing prompts to the user.

24. A computer-readable storage device as recited in claim 12, further comprising instructions for receiving ghost characters from the user.

25. A computer-readable storage device as recited in claim 24, further comprising instructions for causing said ghost characters to be disregarded when determining whether the entered access code matches the stored access code character sequence.

26. A computer-implemented method for user authentication, wherein the computer is coupled to a database including a first access code for a user and a pace, rhythm, or tempo associated with said first access code, comprising:
   providing, via an output device, at least one of a visual, auditory, and tactile timing prompt;
   receiving, via an input device, a second access code and determining a pace, rhythm, or tempo at which the second access code was entered; and
   authenticating the user by determining that the entered second access code matches the stored first access code and that the pace, rhythm, or tempo at which the second access code was entered matches the stored pace, rhythm, or tempo associated with the stored first access code.

27. A method as recited in claim 26, further comprising granting access to a domain, wherein the domain comprises a physical location.

28. A method as recited in claim 26, further comprising granting access to a domain, wherein the domain comprises a software program.

29. A method as recited in claim 26, further comprising granting access to a domain, wherein the domain comprises a file.

30. A method as recited in claim 26, further comprising granting access to a domain, wherein the domain comprises a bank account.

31. A method as recited in claim 26, further comprising altering the pace, rhythm, or tempo associated with the stored first access code.

32. A method as recited in claim 26, wherein the timing prompt is a visual timing aid.

33. A method as recited in claim 26, wherein the timing prompt is an audible timing aid.

34. A method as recited in claim 26, wherein the timing prompt is a tactile timing aid.

35. A method as recited in claim 26, further comprising providing the user with advance knowledge of the timing prompt.

36. A method as recited in claim 26, further comprising associating the first access code with a user identification code and authenticating the user only if the user provides a correct user identification code.

37. A method as recited in claim 26, wherein said computer is disposed in or communicatively coupled to a hand-held electronic device.

38. A method as recited in claim 26, wherein said computer is disposed in or communicatively coupled to a cellular telephone.

39. A method as recited in claim 26, wherein said computer is disposed in or communicatively coupled to an automated teller machine (ATM).

40. A method as recited in claim 26, further comprising providing false timing prompts.

41. A method as recited in claim 26, further comprising receiving and recognizing ghost characters.

42. A method as recited in claim 41, further comprising disregarding said ghost characters when determining whether the entered second access code matches the stored first access code.

43. A computer-implemented system for user authentication, wherein the computer is coupled to a database including a first access code for a user and a pace, rhythm, or tempo associated with said first access code, comprising:
   means for providing the user with at least one of a visual, auditory, and tactile timing prompt to assist the user with entering the access code;
   means for receiving a second access code from the user and determining a pace, rhythm, or tempo at which the second access code was entered by the user;
   means for authenticating the user by determining that the entered second access code matches the stored first access code and that the pace, rhythm, or tempo at which the second access code was entered matches the stored pace, rhythm, or tempo associated with the stored first access code; and
   means for granting access to the user to a domain.

44. A system as recited in claim 43, wherein the domain comprises a physical location.

45. A system as recited in claim 43, wherein the domain comprises a software program.

46. A system as recited in claim 43, wherein the domain comprises a file.

47. A system as recited in claim 43, wherein the domain comprises a bank account.

48. A system as recited in claim 43, further comprising means for altering the pace, rhythm, or tempo associated with the stored first access code.

49. A system as recited in claim 43, wherein the timing prompt is a visual timing aid.

50. A system as recited in claim 43, wherein the timing prompt is an audible timing aid.

51. A system as recited in claim 43, wherein the timing prompt is a tactile timing aid.

52. A system as recited in claim 43, further comprising means for providing the user with advance knowledge of the timing prompt.

53. A system as recited in claim 43, further comprising means for associating the first access code with a user identification code and authenticating the user only if the user provides a correct user identification code.

54. A system as recited in claim 43, wherein said computer is disposed in or communicatively coupled to a hand-held electronic device.

55. A system as recited in claim 43, wherein said computer is disposed in or communicatively coupled to a cellular telephone.

56. A system as recited in claim 43, wherein said computer is disposed in or communicatively coupled to an automated teller machine (ATM).

57. A system as recited in claim 43, further comprising means for providing false timing prompts to the user.

58. A system as recited in claim 43, further comprising receiving and recognizing ghost characters from the user.

59. A system as recited in claim 43, further comprising means for disregarding said ghost characters when determining whether the entered second access code matches the stored first access code.

* * * * *

UNITED STATES PATENT AND TRADEMARK OFFICE
CERTIFICATE OF CORRECTION

PATENT NO. : 7,653,818 B2  Page 1 of 1
APPLICATION NO. : 11/187345
DATED : January 26, 2010
INVENTOR(S) : Michael Lawrence Serpa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Twenty-third Day of November, 2010

David J. Kappos
*Director of the United States Patent and Trademark Office*